US008806057B2

(12) United States Patent
Mendell

(10) Patent No.: US 8,806,057 B2
(45) Date of Patent: Aug. 12, 2014

(54) INTERNET-BASED VALUE-ADDED SERVICES SYSTEM AND METHOD

(75) Inventor: Danton S. Mendell, Wilsonville, OR (US)

(73) Assignee: Neutral Space, Inc., Portland, OR (US)

(*) Notice: Subject to any disclaimer, the term of this patent is extended or adjusted under 35 U.S.C. 154(b) by 476 days.

(21) Appl. No.: 12/454,615

(22) Filed: May 19, 2009

(65) Prior Publication Data
US 2010/0299450 A1 Nov. 25, 2010

(51) Int. Cl.
*G06F 15/173* (2006.01)
(52) U.S. Cl.
USPC .......................................... 709/238; 709/219
(58) Field of Classification Search
USPC .................................................. 709/238, 219
See application file for complete search history.

(56) References Cited

U.S. PATENT DOCUMENTS

| | | | |
|---|---|---|---|
| 6,412,014 B1 | 6/2002 | Ryan | |
| 6,980,990 B2 | 12/2005 | Fellman | |
| 7,039,697 B2 | 5/2006 | Bayles | |
| 7,136,932 B1 | 11/2006 | Schneider | |
| 7,337,910 B2 | 3/2008 | Cartmell et al. | |
| 7,464,136 B2 | 12/2008 | Lemson et al. | |
| 2002/0091703 A1 | 7/2002 | Bayles | |
| 2002/0138649 A1* | 9/2002 | Cartmell et al. | 709/245 |
| 2004/0162916 A1 | 8/2004 | Ryan | |
| 2004/0172463 A1 | 9/2004 | King et al. | |
| 2005/0210149 A1 | 9/2005 | Kimball | |
| 2006/0161681 A1 | 7/2006 | King et al. | |
| 2007/0130316 A1 | 6/2007 | Turakhia | |
| 2007/0180056 A1 | 8/2007 | Assad | |
| 2007/0266141 A1 | 11/2007 | Norton | |
| 2008/0005127 A1* | 1/2008 | Schneider | 707/10 |
| 2008/0235383 A1* | 9/2008 | Schneider | 709/229 |
| 2009/0077383 A1* | 3/2009 | de Monseignat et al. | 713/175 |
| 2009/0313320 A1* | 12/2009 | Parsons et al. | 709/203 |

FOREIGN PATENT DOCUMENTS

| | | |
|---|---|---|
| JP | 2001-236296 | 8/2001 |
| WO | WO 01/17192 | 3/2001 |
| WO | WO 02/37338 | 5/2002 |
| WO | WO 03/094009 | 11/2003 |
| WO | WO 2006/067541 | 5/2006 |

OTHER PUBLICATIONS

International Search Report and Written Opinion for Int'l Patent App. No. PCT/US/10/01478; Jul. 23, 2010 (8 pages).

* cited by examiner

*Primary Examiner* — Dustin Nguyen
*Assistant Examiner* — Joel Mesa
(74) *Attorney, Agent, or Firm* — Patrick D. Boyd; Paul B. Heynssens of Ater Wynne LLP

(57) ABSTRACT

A top-level domain (TLD) hierarchical routing system comprises a domain name server (DNS) configured to analyze a universal resource locator (URL) top-level domain (TLD) and to route an Internet query to a numerical Internet protocol (IP) destination; a proprietary server Internet-coupled with the numerical Internet protocol (IP) destination, the server configured to analyze one or more second-level domains (SLDs) behind the TLD and further to provide an operative engagement between an Internet user and a value-added service in the form of a software-as-a-service (SaaS) or application software program (ASP) relatable to selected ones of plural SLDs that are licensed or otherwise authorized to use the TLD, thereby to add value to the one or more SLDs and to the one or more users sharing such a ubiquitous Internet-based value-added services platform.

9 Claims, 4 Drawing Sheets

Why This Is Big

- Every website on the internet can have a dotCal calendar

> Nike.com .cal
  > mySite.net .cal
  > yourSite.org .cal
  > theirSite.biz .cal
  > info .cal
  > tel .cal

- We initially control .cal (click)
  - Reserved for the registry (click)
  - Now every website has a calendar (click)
  - That we make available for free or fee, while the name space & data is ours...

=> nike.com is owned by Nike. nike.com.cal is owned by the registry until it is purchased by Nike. (done)

FIG. 2

INTERNET-BASED VALUE-ADDED SERVICES SYSTEM AND METHOD

FIELD OF THE INVENTION

The invention relates generally to the field of appending generic top-level or first-level domains (gTLDs) to access value-added services such as software applications via established universal/uniform resource locators (URLs). More particularly, the invention relates to providing a network system and gTLD registration system and one or more software applications that provide users with a consistent and easy and preferably common way to utilize the same and that enable existing domain name owners to provide value-added services having universal appeal in a ubiquitous shared value-added services web-based platform.

BACKGROUND OF THE INVENTION

Traditionally, there have been relatively few TLD extensions or suffixes registered with ICANN including, for example, .com, .net, .org, .info, .biz, etc. Recently, however, ICANN has opened the doors for a multiplicity of additional gTLDs or suffixes granted when deemed useful and helpful based upon a rigorous application process. None applied for or granted by ICANN are believed to represent a proprietary, value-added service offered by applicant for the gTLD that effectively expands the utility of the traditional domain name owner's destination website. So-called global domain name servers (DNSs) have performed the analysis of the suffix to ensure its syntax is one recognized by ICANN, and then have converted the entire domain name from an alphabetic string with embedded dots to a numeric string representing a literal Internet Protocol (IP) address for routing thereto.

BRIEF DESCRIPTION OF THE DRAWINGS

FIG. 2 is a diagrammatic representation of the relationship between the novel top-level-domain (TLD) suffix and traditional second-level-domains (SLDs) in accordance with one embodiment of the invention.

DETAILED DESCRIPTION OF THE PREFERRED EMBODIMENTS

Figure 1:
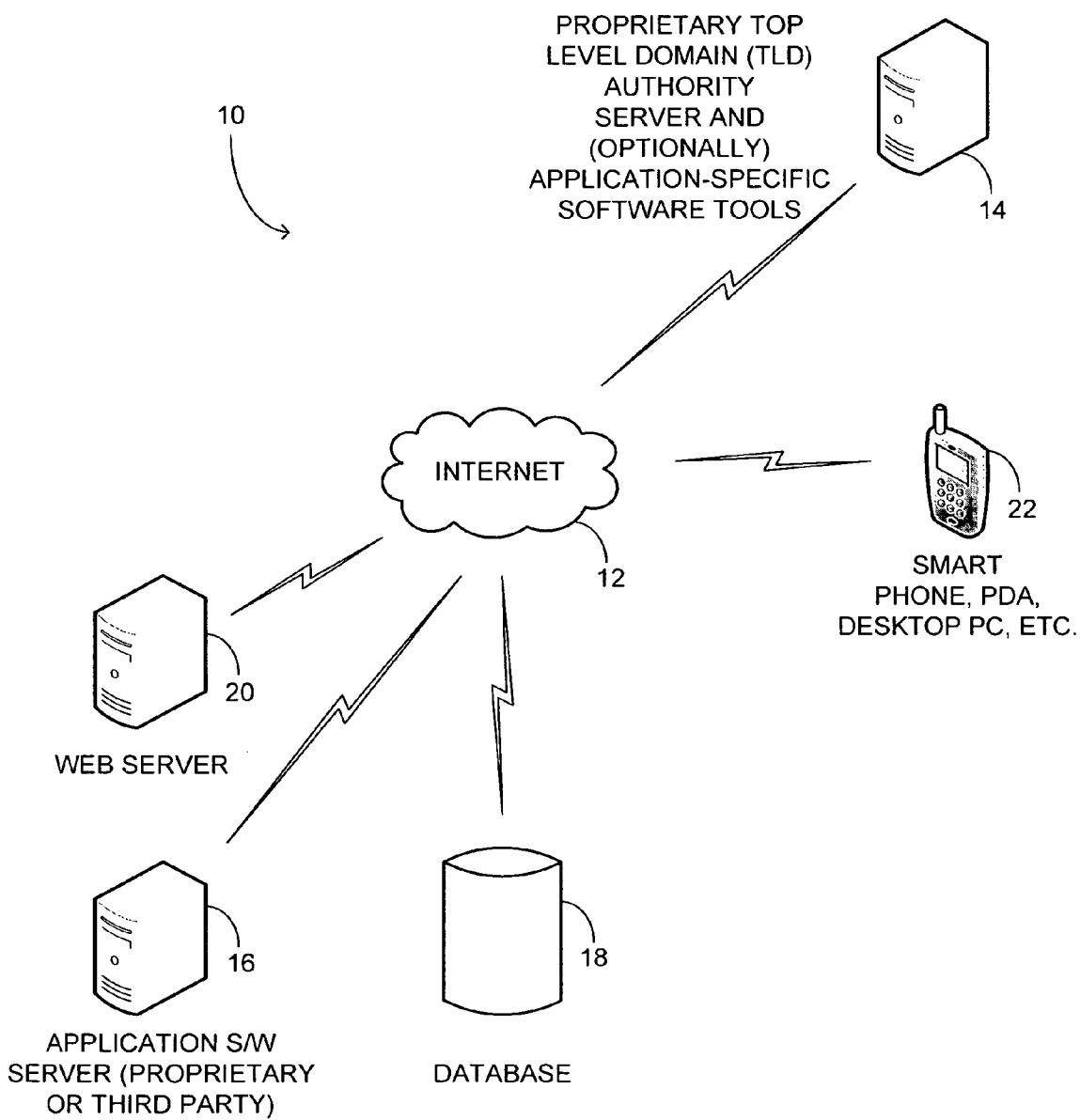
FIG. 1 is a system block diagram illustrating the value-added services system and method, in accordance with one embodiment of the invention.

The invention involves a network/software architecture that enables a user to access value-added services such as proprietary application software by simply appending a novel TLD as a suffix to an existing website's domain name (e.g. www.nike.com, www.comcast.net, www.uspto.info, www.o-su.biz, etc.). For example, www.nike.com is owned by NIKE™. But the owner or licensee of the present invention registers the new extension with ICANN and thus own the top level domain (TLD) represented thereby, e.g. .cal (calendar). The owner then reserves the right to license or sell the suffixed domain name extension to NIKE™ so that NIKE™ can use the application as its appended gTLD (rendering NIKE's www.nike.com a second level domain (SLD)). Nike thus would agree to endorse the value-added service, e.g. a software application program, represented by the registered suffix or TLD. A user invokes the application software by entering, for example, www.nike.com.cal. Of course, NIKE™ represents only one of millions who would benefit, since millions of website owners are expected to adopt the application software-appending invention, thus enabling hundreds of millions of end users to take advantage of what will be effectively somewhat standardized (e.g. supporting a common user model), value-added software applications effectively appended to and thus enhancing the utility and versatility of traditional owner-operated websites world-wide.

The application software could be calendaring, social networking, blogging, wiki, or any other useful application universally symbolized by the appended suffix. But everyone in the world ideally would have access to it by simply appending the proprietary, registry- (e.g. ICANN-) registered, licensed suffix to traditional domain names.

Extended-TLD registrant or assignee ("registered owner") or licensee thereunder would own one or more TLD's registered as extensions (or suffixes) with a root manager such as ICANN. The registered owner or its licensee(s) would offer licensed uses of its one or more applications to any domain name owner that wants to make life easier for (add value to) Internet users, and to any user who appends the gTLD suffix to a licensed domain name. The system architecture in system block diagram form will be described below by reference to FIG. 1.

Briefly, the invented system involves Internet-connected web servers, proprietary or third-party software-as-a-service (SaaS) or application software programs (ASPs such as Chandler calendaring), databases (e.g. MySQL), and proprietary value-added service authority and application-specific software (e.g. security and reputation ID/user rating, data mining and matching algorithms in the case of the representative calendaring/networking application). It will be understood that persons with smart (G) phones, add-on software-capable personal digital assistants (PDAs), desktop computers, or workstations (OS-independent, e.g. including MAC, PC, LINUX, etc.) can utilize the invention in their personal digital "domains", e.g. in conjunction with their own web browsers, search engines, address books, e-mail servers, telephone contact lists, etc.

FIG. 1 is a system block diagram illustrating the invented system in accordance with one embodiment of the invention in which the value-added service is a SaaS. Those of skill in the art will appreciate that the SaaS can provide any suitable application software function that enables users to engage one another with a consistent, easy-to-use and easy-to-recall TLD as an ultimate suffix or extension modifying a traditional domain name. For example, the SaaS can be a .wik (wiki) application, a .gam (game) application, a .lif (life) application, a .soc (social) application, a .blg (blog) application, a .jrn (journaling) application, a .tix (ticketing) application, or any other suitable application briefly but readily recognizably indicated by its coded gTLD extension or suffix.

Invented system 10 includes an Internet 12 connected proprietary TLD authority server 14 providing selective access to one or more (optionally) application-specific software tools such as a calendaring application. Alternatively or additionally connected to Internet 12 is another application software server 16 (whether proprietary or third party). A database/program 18 such as MySQL or another can be provided that is also connected to Internet 12 to provide the registered owner or its licensee with needed database management support. Finally, one or more traditional web servers 20 (labeled WEB SERVER 1 through WEB SERVER n) also can be connected via Internet 12 to provide traditional browser access by users worldwide to websites licensed by the gTLD owner (e.g. the .cal registrant) or its licensee to take advantage of the value-added services enabled by the invention.

One or more smart phones, PDAs, desktop PCs, workstations, or other Internet-enabled devices 22 (labeled NETWORK-CONNECTED DEVICE 1 through NETWORK-CONNECTED DEVICE m) also can be connected to Internet 12 so that a user has access to the application software that is invoked when the registered TLD suffix is appended to an existing URL such as Nike.com. Those of skill in the art will appreciate that the application can be any suitable software application such as calendaring, social networking, e-commerce, etc. and that the application software itself resides on an Internet-connected server that is typically remote from the user of device 22. The server on which the SaaS resides (or is operatively coupled with) executes by way of execution on a machine, e.g. a hardware processor, of machine-readable and machine-executable software instructions or code. The server may be a proprietary or a third-party server. Similarly, the SaaS itself may be proprietary software or licensed or otherwise authorized third-party (e.g. open source) software.

The value-added services provided in accordance with one embodiment of the invention are software services provided to users in a SaaS business model. Such software services can be traditional offerings such as calendars, wikis, blogs, travel, ticketing, social networks, games, chat rooms, etc., and can also provide adjunct services such as geo-location, mapping, data-mining, e-commerce, discounting, couponing, etc. Or such software services can be non-traditional offerings (e.g. shared-calendar management; calendar-embedded advertising; expert-ranking; etc.) that are contemplated by the present invention or developed in the future and rendered to operate compatibly with the present invention. Any and all such software or other value-added services are contemplated as being within the spirit and scope of the invention.

The value-added services can afford users and domain owners unprecedented interoperability. By way of one such example, not intended in any way to limit the scope of the present invention, users may use geo-location aspects of a shared-calendar or calendar-management SaaS to locate their friends and to plan meetings with one another, perhaps at participating businesses. There might be a commercial (e.g. retailer, consumer) opportunity implicated by such social interaction, e.g. a two-for-one coupon bearing a readable barcode image might be downloaded to an on-line user's portable phone, the downloaded coupon permitting the social acquaintances to meet for a discounted price at a nearby STARBUCKS™.

Users might be rated or ranked for their specific demographic, so-called "socio-graphic", or other attributes in a social networking context wherein "thought leaders" or "experts" emerge who can be trusted and engaged to enhance users lives. For example, a wine expert might become an on-line consultant and engaged by an on-line user to recommend a wine tasting or a particularly fragrant and/or palate-pleasing vintage. Thus, the application software might data mine and meta-tag on-line users to determine over time the level or merit of their expertise (i.e. to rank their reputation IDs) in a given field, and such merit determinations could produce rankings of emerging thought leaders on a variety of topics.

Opportunities for monetization of such on-line e-commerce as is contemplated by the invention are myriad. For example, the owner or licensee of the present invention could provide advertising opportunities to its subscribing businesses such as NIKE™ and could collect royalties based upon the number of NIKE™ ads that are viewed by world-wide users of the application software. Alternative monetization or e-commerce, income-producing schemes are contemplated as being within the spirit and scope of the invention.

The gTLD registration, ownership, and acquisition or licensing model is further illustrated in FIG. 2. FIG. 2 is believed to be largely self-explanatory from the detailed description by reference to FIG. 1. It becomes clear from FIG. 2, however, that the registered owner of the novel gTLD suffix representing a value-added service initially controls the name space, such as .cal, unless and until it is purchased or licensed for use by the second-level domain (SLD), e.g. Nike.com or mySite.net or yourSite.org or theirSite.biz or info or tel, or domain owner embedded therebehind. When the entire world has opted into the invented TLD suffix and system architecture to utilize its value-added services, then every website offers a standardized calendaring or social networking or other value-added services capability, and every user has access thereto.

In accordance with one embodiment of the invention, value-added services in the form of SaaSs provide a consistent use model preferably including consistent if not identical user interfaces (UIs). In other words, the use model including the UI is templated for standardization and consistency from an ease-of-use viewpoint but can provide different colors, element placement, etc. The advantage of course is that, whichever website one visits, the calendar or other software service is available in the same use model. Thus, the invention enables common, standardized functionality across the board for familiar, convenient, and user-friendly UIs. This standardization makes re-learning various software service offerings unnecessary and reduces precious learning curve. It also renders the calendaring or other software service function nearly universal because a near universe of website owners are reasonably expected to purchase or license the invented Internet-based value-added services system and method.

Figure 3:
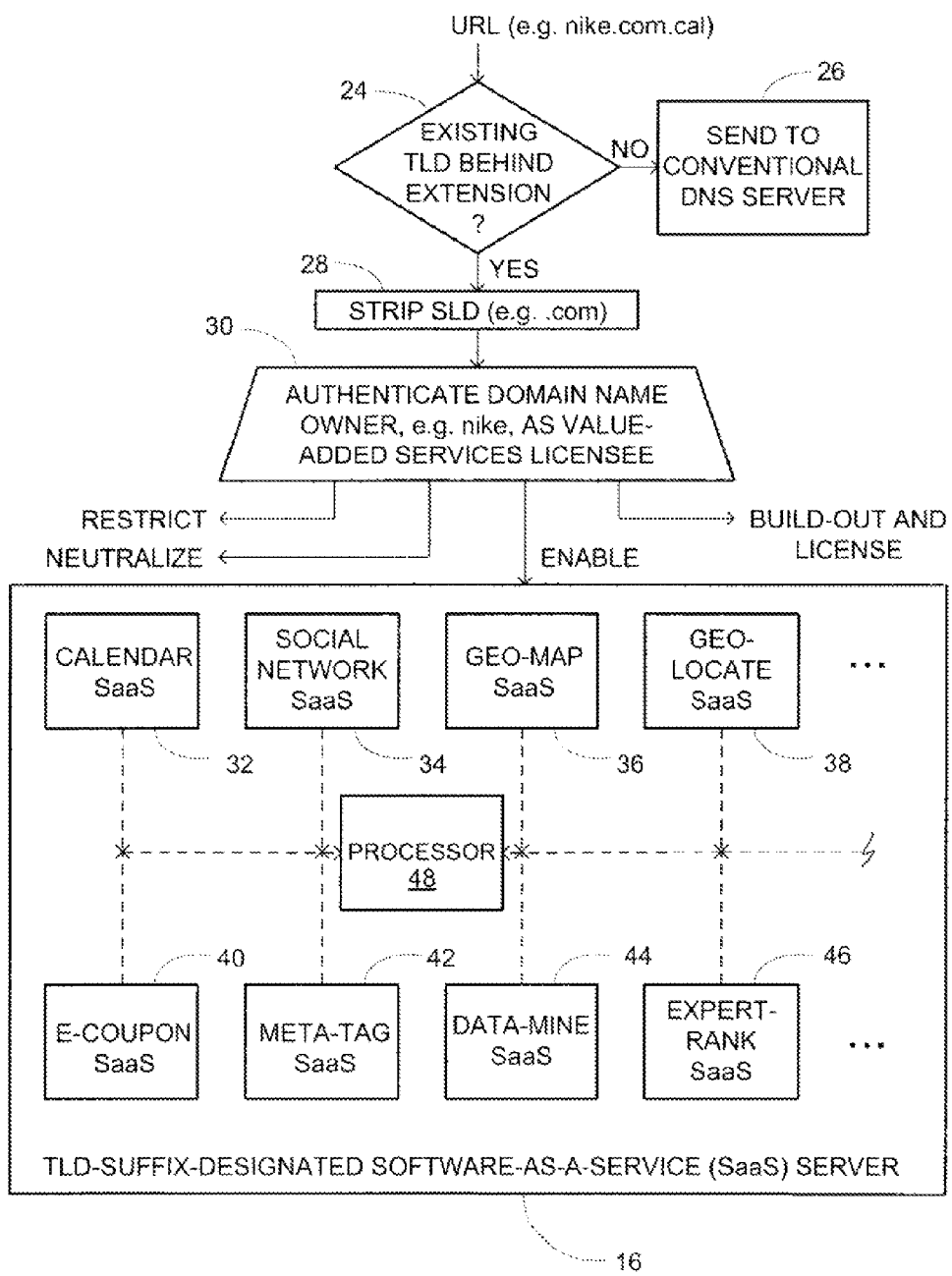
FIG. 3 is a detailed schematic block diagram illustrating calendaring or other software-as-a-service (SaaS) or application software programs (ASP's) that might be invoked or provided by the system of FIG. 1, in accordance with one embodiment of the invention.

Referring now to FIG. 3, it may be seen that TLD authority server or decision maker 14 will be understood effectively to strip or parse past the TLD to determine what the embedded existing TLD or domain name is and which on-line entity it identifies. This is illustrated by Parse URL/decision block 24 that, in accordance with one embodiment of the invention, determines whether the URL string behind the TLD suffix is an EXISTING domain name (traditional TLD) such as .com, .net, .org, etc. If not, then at block 26 xxx.bob.cal, for example, is sent to a conventional DNS server for conventional treatment. For example, bob.cal might be resolved to a Web server, as is customary. If there is no proper web server or registry listing, then an error is returned to the URL query, as is conventional.

If the URL string behind the TLD suffix is an EXISTING TLD, then at block 28, the EXISTING TLD, e.g. .com, is stripped from the URL. Next, at block 30, server 14 then can do one of at least three things ranging from restrictive to neutral to enabling: a) it can refuse to resolve the URL and return nothing; b) it can inform the user that the SLD is not licensed but that the value-added service is nonetheless available; or c) it can resolve the URL by invoking the value-added service associated with the SLD if the SLD is licensed (or otherwise authorized) to use the service. The neutral response b) by server 14 could take the form of a simple demo of the value-added service, e.g. in the form of a generic calendaring function or application. A restrictive or neutral response a) or b) by server 14 could also inform the SLD owner that it should subscribe to the value-added service offering, in order to better serve its on-line browsers who evidently wish to use the same (because they typed the URL with the invented and value-added service-enabling suffix into their web browsers).

Alternatively to restrictive or neutral response a) or b) above, server 14 could d) "build out" the value-added service in the name of the SLD and could invite the SLD owner (e.g. nike.com registrant) to subscribe such that the on-line value-added service thereafter will be available to on-line users. Other possible responses to an attempt by an on-line user to invoke the value-added service—whether restrictive, neutral, or enabling—are contemplated as being within the spirit and scope of the invention. This authentication and decision making is illustrated by block 30 in FIG. 3.

In brief summary, TLD authority server 14 acts like a router to route the on-line user to the next level of value added by invented system 10. It effectively decides which if any value-added services are available and maps client-side requests to available and authorized server-side software application services and resources.

Those of skill in the art will appreciate that TLD authority server 14 can be a super- or enhanced-performance DNS server also a part of Internet 12, can be a proprietary TLD server that is separate from the traditional DNS server that is part of Internet 12, and/or can be a front-end process executed within SaaS server 16. In other words, the URL parsing and routing logic, within the spirit and scope of the invention, can reside at any one or more nodes. Indeed, the functionality can be distributed across various physical platforms, as between a traditional DNS server that forms a part of Internet 12 and a TLD authority server 14, between an enhanced-performance DNS server that forms a part of Internet 12 and a proprietary or third-party SaaS server 16, or between a traditional DNS server that forms a part of Internet 12 and a proprietary or third-party SaaS server 16 having a front end that performs the decision-making or TLD authority server authentication function.

For example, a proprietary server can receive the URL request and can perform the authentication function locally based upon data-based look-up tables of registered or licensed owners that are authorized to take advantage of the requested value-added service, and then the authorized URL including the authorized gTLD extension can be added via a traditional service call to an existing DNS that is a part of Internet 12. The existing public DNS then can route the authorized URL request directly to the value-added service or SaaS application server, whether proprietary or owned by a third party. Such routing is known to those of skill in the art, and can be thought of as having the TLD authority server update the data into the DNS cluster and having the DNS effectively publish the authorized routing instructions to the world. In accordance with this distributed- or shared-function embodiment of the invention, the TLD authority server can be thought of as a decision-making service that instructs the existing DNS cluster how to route an authorized URL request (that includes an authorized domain name) to provide the requested value-added service, e.g. the suffix-coded SaaS.

It is, of course, expected and most desirable that all such on-line requests to invoke the application software via the reserved TLD would resolve to providing the value-added services to the online user who attempted to invoke them, since at some point in time it is contemplated that all SLD owners would sign up for the provision of value-added services to users everywhere, and that the gTLD or suffix itself would become known to and used by users everywhere.

In brief summary, FIG. 3 illustrates that TLD authority server 14 in accordance with one embodiment of the invention includes a URL-parsing decision block or mechanism 24, a SLD-stripping block mechanism 28, and a domain name-authenticating mechanism 30. Parsing decision block 24 will be understood to parse the URL received from the DNS server that forms a part of Internet 12 (refer briefly to FIG. 1) and effectively to strip the TLD (e.g. .cal) therefrom leaving the remnant string terminating in the recognized SLD (e.g. xxx-.com) intact. Authenticating/routing mechanism 30 will be understood to determine whether the SLD or domain name registrant behind the recognized EXISTING TLD is authorized to utilize the value-added services, i.e. whether the registered owner of the SLD is a licensee of the owner of the proprietary technological invention described and illustrated herein, and to route or otherwise enable the routing of the authorized URL request for fulfillment of the value-added service.

Thus, TLD authority server or decision-making mechanism 14 will be understood to maintain the routing and meta-tagging information for various devices connected with the value-added service in the form of one or more SaaS servers 16. Those of skill in the art will appreciate that, in accordance with one embodiment of the invention, the authority server or decision-making mechanism utilizes security certificates to protect access to the routing information.

As described above, authenticating mechanism 30 can restrict access to the value-added services, can neutralize access thereto, can build out and proffer a license to the domain name registrant, or can enable access to the value-added services. Thus URL parsing/decision mechanism 24 and authenticating mechanism 30 collectively make a determination whether and how to honor the request for access to the value-added services thus securing the proprietary rights of the owner of the present invention or its licensee and protecting the SaaS or other value-added service from unauthorized use.

As is explained above, these parsing, authenticating, and routing functions can be performed within a super-DNS cluster that forms a part of Internet 12, within TLD authentication server 14, or as a front-end processor that forms a part of SaaS server 16, or can be distributed among two or more thereof, all within the spirit and scope of the invention.

Those of skill in the art will appreciate that the parsing, authenticating, and routing functions can be consolidated or distributed and concurrently executed or sequentially phased whether across a bank of one or more enhanced DNS servers configured with decision-making capabilities, a bank of one or more traditional DNS servers, a bank of one or more traditional DNS servers coupled with one or more authority servers each configured with decision-making capabilities, or a bank of one or more traditional DNS servers coupled with one or more SaaS servers each configured with front-end decision-making capabilities described and illustrated herein. Those of skill in the art also will appreciate that, in accordance with one embodiment of the invention, these functions are performed by the execution of machine-readable memory-stored instructions by a processor specially adapted thereby to act as a special-purpose computer. Nevertheless, these and other system architectures and configurations are contemplated as being within the spirit and scope of the invention.

If access to the SaaS (also referred to herein as the ASP) representing the value-added service is enabled, then one or more of the SaaSs offered by the provider 16 (which typically is implemented as one or more proprietary or third-party servers as represented in FIG. 1) of the value-added service is invoked. Such SaaSs can include any one or more of a calendar SaaS 32, a social networking SaaS 34, a geo-map SaaS 36, a geo-locate SaaS 38, an e-coupon SaaS 40, a meta-tag SaaS 42, a data-mine SaaS 44, an expert-rank SaaS 46, or any other suitable SaaS application such as a wiki, gaming, blogging, journaling, ticketing or any other suitable value-added service embodied in application software (these last not specifically shown in FIG. 3). Those of skill in the art will appreciate that this illustrated array of SaaSs is illustrative and not exhaustive or in any way otherwise limiting of the scope of the invention (as indicated by the ellipses of FIG. 3). Those of skill in the art will appreciate that the SaaSs are illustrated as residing on a single server, but that, within the spirit and scope of the invention, one or more may reside in accordance with embodiments of the invention on one or more servers distributed across Internet 12. This will become more clear by reference to FIG. 4 discussed below.

A processor 48 is configured to execute machine-readable instructions representing the SaaS, the instructions typically being stored in a memory (not shown for the sake of clarity). Thus, it will be understood that the machine-readable instructions when executed by the processor configure the processor as a special-purpose computer that realizes an instantiation of the one or more SaaSs. In other words, the invention in accordance with one embodiment will be understood to be implemented by way of memory-based software instructions that configure or adapt a general purpose computer when executed thereby into a special-purpose computer serving one or more unique machine functions. Those of skill in the art also will appreciate that, in accordance with one embodiment of the invention, authority server 14 is similarly implemented.

Those of skill in the art will appreciate that the SaaSs illustrated in FIG. 3 are simply illustrative and neither comprehensive nor exhaustive of the myriad SaaSs that can be provided by the present invention. Thus, other suitable but entirely different SaaSs are contemplated as being within the spirit and scope of the invention.

Those of skill in the art will appreciate, for example, that calendar SaaS 32 might provide shared-calendaring and calendar-management services, within the spirit and scope of the invention. SaaS 32 would, for example, offer one or more such value-added services as the use of DNS structure fields/records for routing and referencing; the use of security certificates to restrict calendar access to users with good reputations; the use of keywords or meta-tags to categorize calendaring information specific to the domain's relationships, categories, and owner reputation; the use of thought leaders and validation schema based upon peer review and interaction to produce a reputation identification (ID) across various disciplines; geo-location to target social networking and e-commerce opportunities for users and businesses; the use of web hubs to manage social networking of calendar data; data mining and culling to produce consumer/business synergies; the use of G phones to present bar code coupons representing discounted goods and services; the use of i-Phones, Android G1s and the like for auto-syncing/time-tracing, as well as desktop solutions; etc.

Of course those of skill in the art will appreciate that other calendaring, social networking, e-commerce, and geo-locating services are contemplated, in addition to those listed above, and are within the spirit and scope of the invention. Indeed, any suitable value-added services in the form of software applications are within the spirit and scope of the invention, whether expressly listed herein or not.

Figure 4:
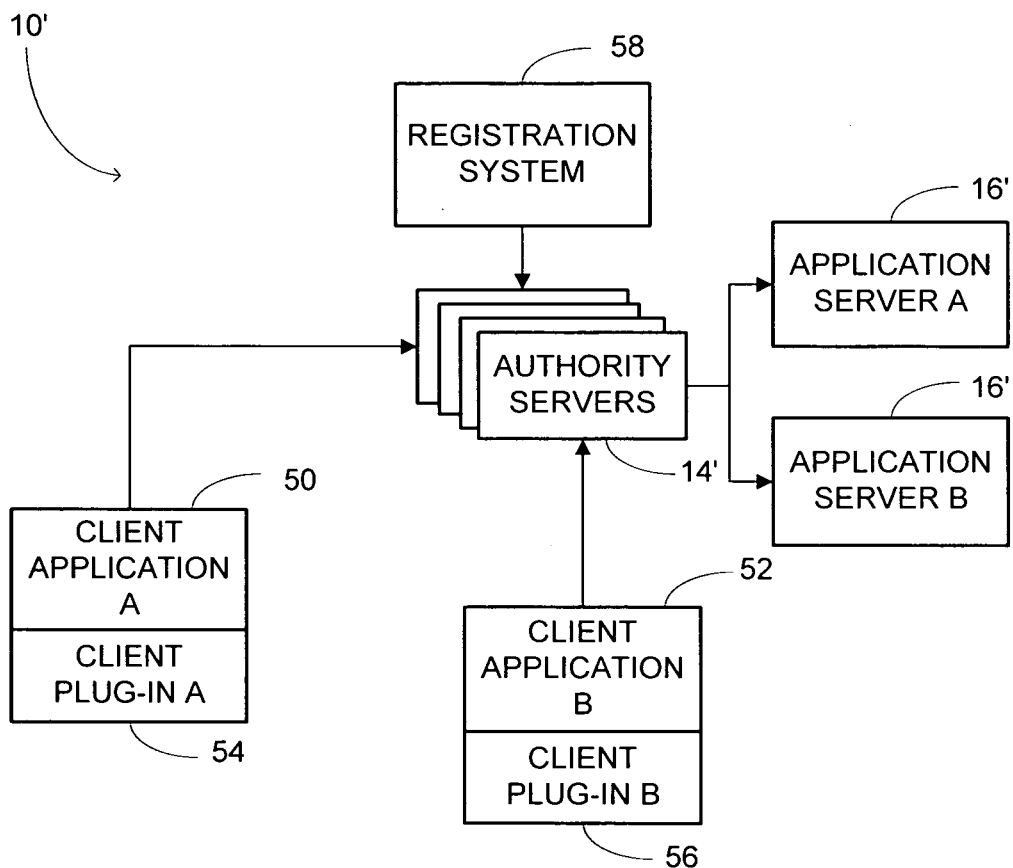
FIG. 4 is a system block diagram illustrating the value-added services system and method, in accordance with another embodiment of the invention.

FIG. 4 illustrates another view of an alternative embodiment of invented system 10' in system block diagram form. Those of skill will appreciate that identical functions are designated with identical reference designators, and that similar functions are designated with primed (') but otherwise identical reference designators. Those of skill also will appreciate that, while not shown as a cloud, embodiments of the invention are of a web-based architecture and typically involve the use of some kind of web-based communication, whether a local area network (LAN), wide-area network (WAN), or a world-wide web (WWW) such as the Internet.

System 10' includes one or more TLD authority servers 14' performing the same parsing, stripping and decision-making functions of blocks 24, 28, and 30 described and illustrated above. It also includes one or more software application servers 16' (e.g. two application servers A and B) operatively coupled with the one or more authority servers 14'. System 10' further includes client-side software including one or more client applications 50 and 52 each with an associated client plug-in 54 and 56 (e.g. two client applications A and B and two associated client plug-ins A and B) operatively coupled with the one or more authority servers 14'. Finally, system 10' includes a registration system 58 operatively coupled with the one or more authority servers 14', registration system 58 being implemented in accordance with gTLD registry requirements, perhaps operating over the Internet itself, and communicating gTLD registration policy and available gTLD suffix registry offerings and permissions to the one or more authority servers 14'.

Those of skill in the art will appreciate that, in accordance with one embodiment of the invention, client applications 50, 52, plug-ins 54, 56, and registration system 58 also are implemented in software by way of machine-executable instructions stored in memory and processed in a processor or general purpose computer that, when executing such unique instructions, is configured or adapted into a special-purpose computer providing the unique set of functions described herein.

Those of skill in the art will appreciate that, in accordance with embodiments of the invention, some client-side e-mail applications may not support the gTLD-suffixed standard. Thus client plug-ins may be used to provide such e-mail services that utilize the invented gTLD-suffixed SaaS until such time as the e-mail application provider adopts the invented standard and provides such support. This is why client-side applications A and B are shown with client-side plug-ins A and B, respectively, in FIG. 4. Such would be used in the event the client-side application does not yet recognize the CX record or the TXT format for a calendar or other value-added services server, and, for example, would provide equivalent functionality contemplated as being within the spirit and scope of the invention.

In accordance with one instantiation of a calendaring application as a SaaS within the invented domain, a hub might utilize CalDAV, a standard that passes back and forth basic information about the timing of events. The use of CalDAV enables connections to Microsoft's OUTLOOK™, via a plug-in, or Apple's ICAL™ in a native way, and many other CalDAV-enabled clients. Those of skill in the art will appreciate that, at its core, calendar sharing is really a social network. Thus, CalDAV and iCalendar (a format) must be accommodated by extensions to the basic calendaring information. Reputation, Access Control, Categorization, Peer Review, and other natural extensions are provided by the hub. In a way, the hub itself is a SaaS that communicates with client applications that do not have such built-in capabilities. Access control preferably is built around a forward-looking peer-to-peer model rather than a simpler but retrogressive silo model.

The TLD authority server will be understood to maintain the routing and meta-tag information for various devices on reference to the application software server. The TLD authority server also utilizes security certificates to protect access to the routing information.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

I claim:

1. A method of providing users access to Internet-ubiquitous value-added on-line services by way of an appended top-level domain (TLD) naming convention, the method comprising:
    storing, at a non-transitory data storage medium, data indicating that a third-party is authorized to utilize, in response to Internet queries from users, a proprietary software-as-a-service (SaaS) application comprising device-executable coded instructions stored at a non-transitory data storage medium of a server (SaaS server), wherein:
        the third-party possesses rights to a uniform resource locator (third-party URL) corresponding to a distinct IP address,
        the third-party URL sequentially includes a second level domain (SLD) and a Top Level Domain (TLD), and
        utilizing the SaaS application includes processing, by a data processor operably coupled with the SaaS server, information relating to the third-party, and transmitting a reply from the SaaS server to the querying user, wherein the reply includes the third-party information and a result of the processing;
    receiving, at a TLD authority server, an Internet query from a user, wherein the query sequentially includes the third-party URL and a proprietary TLD suffix, and wherein the proprietary TLD suffix is registered with an authorized Internet registration organization and corresponds to an IP address of the TLD authority server;
    parsing past the TLD suffix of the query, via a URL-parsing mechanism operably coupled with the TLD authority server, and determining an identity of the third party corresponding to the remaining third-party URL;
    confirming, via an authenticating/routing mechanism operably coupled with the data storage medium at which is stored the third-party authorization data, that the identified third-party is authorized to utilize the SaaS stored at the SaaS server; and
    routing the query to the SaaS server for utilization of the SaaS, but not routing the query to the IP address corresponding to the third-party URL.

2. The method of claim 1, further comprising:
    routing to the TLD authorization server user Internet queries having URLs that tem with the proprietary TLD suffix.

3. The method of claim 2, wherein the routing involves a first routing to resolve the registered TLD suffix and a second routing to resolve the third-party URL behind the TLD suffix.

4. The method of claim 3, wherein the first routing is performed by a first server and the second routing is performed by a second server.

5. The method of claim 4, wherein the first server is configured further to maintain routing, and meta-tag information for one or more Internet-connected devices.

6. The method of claim 1, wherein the routing the query to the SaaS server includes mapping the SLD of the third party URL to a particular one or more SaaS applications authorized for use by the third party, and identifying an IP address of the SaaS server configured with the one or more SaaS applications.

7. The method of claim 1, wherein the SaaS application includes one or more software applications chosen from the group consisting of calendaring applications, social networking applications, geo-mapping applications, geo-locating applications, e-couponing applications, meta-tagging applications, demographic data mining applications, expert ranking applications, wild applications, blogging applications, journaling applications, travel applications, database correlation applications, data lookup applications, and ticketing applications.

8. The method of claim 1, wherein the SaaS application is configured to present a standardized use model to one or more Internet users who make one or more queries.

9. The method of claim 1, wherein the TLD authority server is a different server from the SaaS server.

* * * * *

UNITED STATES PATENT AND TRADEMARK OFFICE
CERTIFICATE OF CORRECTION

| | | |
|---|---|---|
| PATENT NO. | : 8,806,057 B2 | Page 1 of 1 |
| APPLICATION NO. | : 12/454615 | |
| DATED | : August 12, 2014 | |
| INVENTOR(S) | : Danton S. Mendell | |

It is certified that error appears in the above-identified patent and that said Letters Patent is hereby corrected as shown below:

In the Claims

Column 10:
 at line 44, replace "applications, wild applications, blogging applications," with --applications, wiki applications, blogging applications,--

Signed and Sealed this
Twenty-eighth Day of October, 2014

Michelle K. Lee
*Deputy Director of the United States Patent and Trademark Office*